United States Patent
Linhard et al.

(10) Patent No.: US 8,130,976 B2
(45) Date of Patent: Mar. 6, 2012

(54) BANDPASS BOX IN THE SUPPORTING STRUCTURE OF A VEHICLE

(75) Inventors: Klaus Linhard, Schelklingen (DE); Norbert Niemczyk, Pforzheim (DE)

(73) Assignee: Daimler AG, Stuttgart (DE)

( * ) Notice: Subject to any disclaimer, the term of this patent is extended or adjusted under 35 U.S.C. 154(b) by 590 days.

(21) Appl. No.: 12/301,043

(22) PCT Filed: Feb. 1, 2007

(86) PCT No.: PCT/EP2007/000859
§ 371 (c)(1),
(2), (4) Date: Nov. 17, 2008

(87) PCT Pub. No.: WO2007/134650
PCT Pub. Date: Nov. 29, 2007

(65) Prior Publication Data
US 2009/0185709 A1    Jul. 23, 2009

(30) Foreign Application Priority Data
May 19, 2006    (DE) .......................... 10 2006 023 909

(51) Int. Cl.
*H04B 1/00* (2006.01)
*H04R 25/00* (2006.01)
*H04R 5/02* (2006.01)
*H04R 9/06* (2006.01)
*H04R 1/02* (2006.01)

(52) U.S. Cl. ............ 381/86; 381/87; 381/150; 381/302; 381/304; 381/305; 381/332; 381/335; 381/336; 381/338; 381/345; 381/351; 381/386; 381/389; 381/393

(58) Field of Classification Search .................... 381/86, 381/87, 302, 304, 305, 335, 336, 386, 389, 381/150, 332, 338, 345, 351, 393
See application file for complete search history.

(56) References Cited

U.S. PATENT DOCUMENTS 4,161,995 A * 7/1979 Pohlmann et al. ............ 181/150
4,267,993 A * 5/1981 Shimizu et al. .............. 248/27.1
(Continued)

FOREIGN PATENT DOCUMENTS
DE            19735082 A1    2/1999
(Continued)

*Primary Examiner* — Ida M Soward
(74) *Attorney, Agent, or Firm* — Patent Central LLC; Stephan A. Pendorf

(57) ABSTRACT

A sound system which has, for example, a radio, a cassette and a CD player is usually already installed in cars as standard or as an option. In addition, a better sound system includes a box system which has a tweeter and a woofer. In order to provide a speaker box which is suitable particularly for dispensing frequencies below 150 Hz and at the same time has neat pulses accompanied at the same time by little distortion, pulse dynamics and is highly effective, a sound transducer (10) is introduced into the supporting structure of the vehicle. This takes place in such a manner that subcompartments which are separated from each other adjoin each of its two membrane sides. In this case, the two subcompartments of the speaker box are formed by at least two elements (2, 3, 4) of the supporting structure of the vehicle (1). The sound transducer (10) is particularly integrated into a region in which two elements (2, 3, 4) of the supporting structure meet each other, thus resulting in an installation position which can be realized in a structurally and economically favorable manner.

7 Claims, 1 Drawing Sheet

U.S. PATENT DOCUMENTS

| | | | |
|---|---|---|---|
| 4,597,470 A * | 7/1986 | Takagi et al. | 181/141 |
| 4,600,208 A * | 7/1986 | Morishima | 280/288.4 |
| 4,866,776 A * | 9/1989 | Kasai et al. | 381/302 |
| 4,877,105 A * | 10/1989 | Mugikura | 181/141 |
| 5,170,435 A * | 12/1992 | Rosen et al. | 381/86 |
| 5,218,175 A * | 6/1993 | Scarlata | 181/141 |
| 5,457,749 A * | 10/1995 | Cain et al. | 381/71.5 |
| 5,471,018 A * | 11/1995 | Nieuwendijk et al. | 181/152 |
| 5,646,381 A * | 7/1997 | Boyte, Jr. | 181/141 |
| 5,966,453 A * | 10/1999 | Koyano et al. | 381/86 |
| 6,141,428 A * | 10/2000 | Narus | 381/338 |
| 6,977,110 B2 * | 12/2005 | Funakoshi | 428/138 |
| 7,227,969 B2 * | 6/2007 | Maekawa et al. | 381/345 |
| 7,313,247 B1 * | 12/2007 | Tilli et al. | 381/389 |
| 7,536,019 B2 * | 5/2009 | Putti et al. | 381/86 |
| 8,044,413 B2 * | 10/2011 | Albus et al. | 257/86 |
| 2003/0076964 A1 * | 4/2003 | Stickles et al. | 381/86 |
| 2005/0135642 A1 * | 6/2005 | Dry | 381/302 |
| 2005/0190935 A1 * | 9/2005 | Sakamoto | 381/302 |
| 2008/0118098 A1 * | 5/2008 | Irby et al. | 381/424 |
| 2008/0247564 A1 | 10/2008 | Albus et al. | |

FOREIGN PATENT DOCUMENTS

| | | |
|---|---|---|
| DE | 19909143 A1 | 11/2000 |
| FR | 1587761 A | 3/1970 |
| JP | 62103648 U1 | 7/1987 |
| JP | 2087898 A1 | 3/1990 |
| JP | 5041292 U1 | 6/1993 |
| JP | 6113381 A1 | 4/1994 |
| JP | 07199952 A | 8/1995 |
| WO | 2007036245 A | 4/2007 |

* cited by examiner

BANDPASS BOX IN THE SUPPORTING STRUCTURE OF A VEHICLE

BACKGROUND OF THE INVENTION

1. Field of the Invention

The invention relates to a loudspeaker box in the supporting structure of a motor vehicle.

2. Description of the Related Art

Automobiles usually have a sound system installed in them, merely as standard or as special equipment, which has a radio, a cassette player and a CD player, for example. In addition, a better sound system comprises a box system which has tweeters and woofers.

Since the loudspeakers radiate their sound to the vehicle interior, interference problems are avoided by connecting said loudspeakers to a resonance volume which is not connected to this interior. To this end, it is known practice to integrate particular cavity volumes, what are known as loudspeaker boxes, at suitable locations in the vehicle, but this usually results in a reduction in the available storage volume in the motor vehicle or takes up volume in the door lining.

German laid-open specification DE 197 35 082 A1 describes the coupling of a small loudspeaker box with a small resonance volume, which is fitted beneath the driver's seat, to a larger cavity volume (sill volume) which is already present in the motor vehicle in order to increase the size of the resonance volume associated with a loudspeaker. In this case, both the small loudspeaker box and the wall of the cavity volume have an opening, said openings being attuned to one another. In order to achieve acoustic coupling for the two resonance compartments, the loudspeaker box needs to be mounted with an exact fit on the wall of the cavity volume, so that the openings in the wall and the loudspeaker box lie on top of each other for the passage of sound.

Particularly for the output of frequencies below 150 Hz, bandpass boxes are particularly suitable. These exhibit a high level of pulse cleanliness and at the same time have low distortion, dynamic pulses and a high level of efficiency. The operating principle is already described in FR 1 587 761 A1 and comes from the fact that each side of a loudspeaker's diaphragm is assigned a dedicated chamber. Low-frequency sound reaches the outside only via a reflex opening arranged on a chamber. This gives rise to a spring action which has equal effect on both sides of the diaphragm, so that nonlinear distortions are reduced.

German laid-open specification DE 199 09 143 A1 describes the possibility of integrating a box into the supporting structure of a motor vehicle. This document proposes fitting a partition within a sidemember of the motor vehicle parallel along the longitudinal progression thereof, in order to split the supporting structure into two cavities which are separate from one another. A loudspeaker is fitted into this partition such that each of the two sides of the diaphragm is adjoined by one of the cavities. Tunnel-like deflecting ducts route sound waves produced by the loudspeaker in the supporting structure out of the latter into the vehicle compartment such that they emerge into the vehicle interior essentially transversely with respect to the longitudinal direction of the vehicle. The two bass outlet openings are in this case arranged at a distance from one another such that their distance is attuned to the sound waves propagating in the cavities, so that a kind of transmission line box is obtained.

It is an object of the invention to provide a loudspeaker box in combination with the supporting structure of a vehicle and which has good acoustic properties and can be produced without great mechanical design complexity.

BRIEF SUMMARY OF THE INVENTION

The object is firstly by a bandpass box having the features set forth in the claims. Advantageous developments and refinements of the invention are described in the subclaims.

An active sound transducer is inserted into the loudspeaker box according to the invention and positioned such that each of its two sides of the diaphragm are adjoined by subcompartments which are separate from one another. In this case, these two subcompartments are formed by the volume of the cavity in at least one element of the supporting structure of the vehicle. A tunnel is provided in the wall of at least one of the elements and is used to introduce at least some of the sound waves produced in the subcompartments by the sound transducer into the interior of the vehicle. Inventively, the two subcompartments in the loudspeaker box are formed by at least two elements of the supporting structure of the vehicle. In this case, the sound transducer is integrated into a region in which two elements of the supporting structure meet one another.

The fact that the total volume of the loudspeaker box is formed by a combination of a plurality of elements of the supporting structure advantageously allows high-quality reproduction of low-frequency sound (bass). Furthermore, the choice of installation location for the sound transducer in the region in which two elements of the supporting structure meet one another allows favorable positioning in terms of design and cost; it is thus conceivable to provide the elements' transient regions, which need to be designed individually when the vehicle is designed any way, with omissions which are suitable for the installation of a sound transducer. It is also conceivable to make the transient regions accessible for mounting the sound transducer.

The elements of the supporting structure can be divided into the subcompartments of the loudspeaker box which adjoin the two sides of the diaphragm of the sound transducer on the basis of the dimensions of the elements solely using a loudspeaker basket which matches these dimensions and in which the sound transducer is integrated. However, it is also entirely conceivable for the subcompartments to have their design divided by a wall into which the sound transducer is introduced.

BRIEF DESCRIPTION OF THE SEVERAL VIEWS OF THE DRAWINGS

The invention is explained in detail below with reference to figures, in which.

DETAILED DESCRIPTION OF THE INVENTION

Figure 1:
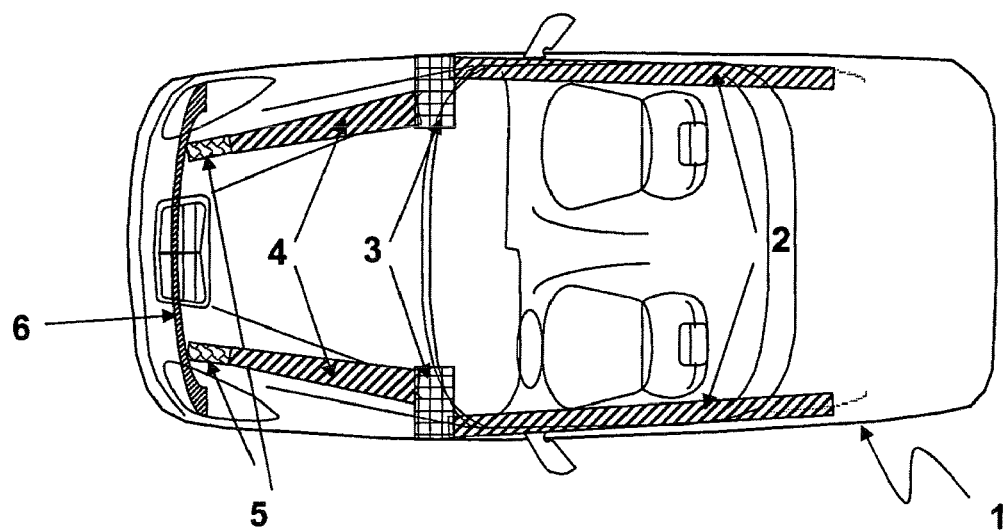
FIG. 1 shows elements of the supporting structure which are connected to one another and are typically situated in a vehicle.

FIG. 1 shows an example of a vehicle (1) having typical elements (2, 3, 4, 5, 6) of the supporting structure; in this case sill volumes (2), crossmembers (3) and sidemembers (4), and also flexible crossmembers (5) and a front crossmember (7). To attain a desired volume for the loudspeaker box, it is now conceivable within the context of the invention to acoustically couple single ones or all of these supporting structural elements (2, 3, 4, 5, 6) to one another.

Figure 2:
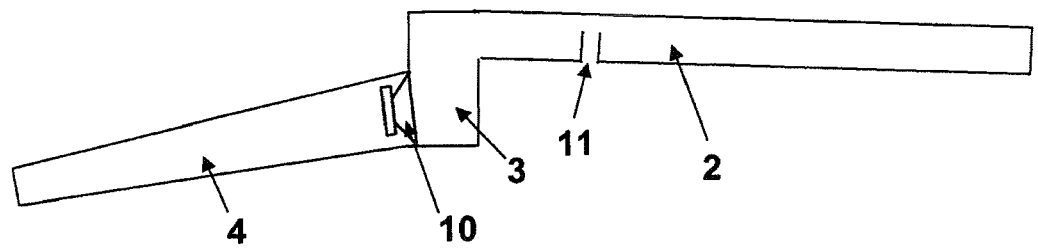
FIG. 2 shows a loudspeaker box according to the invention which uses the volume of three interconnected elements of the supporting structure.

FIG. 2 schematically shows a loudspeaker box according to the invention by way of example. In this case, the total volume of the loudspeaker box is formed by the sill volume (2), the crossmember (3) and the sidemember (4). Inserted between the crossmember (3) and the sidemember (4) is the sound transducer (10). In the example illustrated here, the dimensions of the sound transducer (10) match the dimensions of the supporting structure, particularly by virtue of suitable designing of the loudspeaker basket, such that said sound transducer divides the total volume into two subcompartments which are separate from one another. In this case, a first, enclosed subcompartment is formed by the sidemember (4), while the second subcompartment comprises the shared volume of the acoustically intercoupled crossmembers (3) and sills (2). This subcompartment is coupled to the surroundings of the sill by means of a tunnel (11). In the installation situation for the elements (2, 3, 4) which is illustrated by means of FIG. 1, the sound produced by means of the sound transducer (10) would be radiated into the interior of the vehicle via the tunnel (11). In a particularly advantageous manner, the surface area of the opening of the tunnel (11) should be approximately one fifth, but at least one tenth, of the effective surface area of the diaphragm of the sound transducer (10). In addition to the example shown here for the division of the two subcompartments through suitable dimensioning of the sound transducer (10) or its loudspeaker basket, it is more or less self-evidently conceivable to divide the total volume formed by the elements (2, 3, 4) into two subcompartments using a partition and to insert the sound transducer (10) into this partition.

Figure 3:
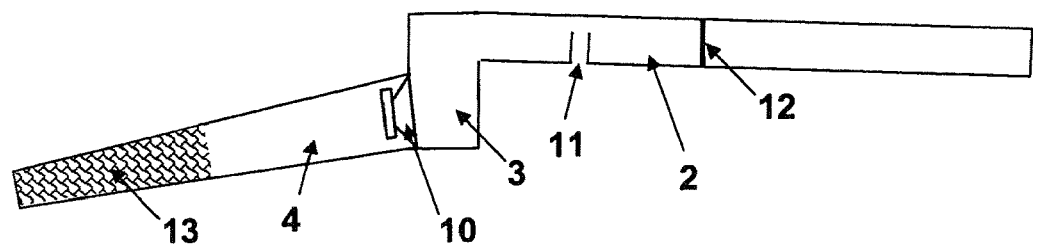
FIG. 3 shows an alternative refinement of the loudspeaker box from FIG. 2, with a limited range of volume and filling material in the enclosed subcompartment.

FIG. 3 shows an alternative refinement of the loudspeaker box from FIG. 2. In this case, insulation material (13) has been inserted into the enclosed subcompartment formed by the sidemember. Advantageously, the enclosed subcompartment is at least half-filled with acoustic insulation material (13). It is also of further benefit to the acoustic properties of the loudspeaker box to provide the subcompartment which is open to the vehicle interior by means of the tunnel (11), in this case formed by the crossmember (3) and sill (2), with insulation material at least in part on its walls. The fact that only the walls are provided with insulation material means that as little sound energy as possible is swallowed and the bass can be outlined.

In the example illustrated in FIG. 3, the volume of the sill (2) which is available for the loudspeaker box has been limited by inserting a partition (12). Such a design measure can easily be used to ensure that the two divided subcompartments which adjoin the two sides of the diaphragm of the sound transducer (10) have essentially the same order of magnitude, so that a similar sound pressure is produced on both sides of the diaphragm of the sound transducer (10).

Advantageously, the resonance volume of the loudspeaker box can also be increased by virtue of at least some of the elements (2, 3, 4, 5, 6) of the supporting structure which form the subcompartments being connected by means of diffusion openings to the surroundings of the vehicle (1).

The invention claimed is:

1. A loudspeaker box in a vehicle having a supporting structure, comprising
    at least one active sound transducer (10), including a diaphragm with first and second sides, fitted in the loudspeaker box,
    at least first and second subcompartments, wherein the sound transducer positioned such that the first and the second sides of its two sides of the diaphragm are adjoined respectively by one of the respective subcompartments which are isolated from one another and which are each formed by the volume of the cavity in at least one element (2, 3, 4) of the supporting structure of the vehicle (1), and
    at least one sound tunnel (11) between a subcompartment and the vehicle interior in which at least some of the sound waves produced in the subcompartments by the sound transducer (10) are introduced into the interior of the vehicle (1),
    wherein the subcompartments are formed by at least two elements (2, 3, 4) of the supporting structure of the vehicle (1), and
    wherein the sound transducer (10) is integrated in a region in which at least two elements (2, 3, 4) of the supporting structure meet one another.

2. The loudspeaker box as claimed in patent claim 1, wherein only the sound from one of the two subcompartments is routed into the interior of the vehicle (1).

3. The loudspeaker box as claimed in claim 1, wherein the two subcompartments have volumes in essentially the same order of magnitude.

4. The loudspeaker box as claimed in claim 1, wherein the surface area of the opening of the tunnel (11) is approximately one fifth, but at least one tenth, of the effective surface area of the diaphragm of the sound transducer (10).

5. The loudspeaker box as claimed in claim 1, wherein at least some of the supporting structure's elements (2, 3, 4, 5, 6) which form the subcompartments are connected to the surroundings of the vehicle (1) via diffusion openings.

6. A loudspeaker box in a vehicle having a supporting structure, comprising
    at least one active sound transducer (10), including a diaphragm with first and second sides, fitted in the loudspeaker box,
    at least first and second subcompartments, wherein the sound transducer positioned such that each of its two sides of the diaphragm is adjoined by a one of the respective subcompartments which are isolated from one another and which are formed by the volume of the cavity in at least one element (2, 3, 4) of the supporting structure of the vehicle (1), and
    at least one sound tunnel (11) between a subcompartment and the vehicle interior in which at least some of the sound waves produced in the subcompartments by the sound transducer (10) are introduced into the interior of the vehicle (1),
    wherein the subcompartments are formed by at least two elements (2, 3, 4) of the supporting structure of the vehicle (1),
    wherein the sound transducer (10) is integrated in a region in which at least two elements (2, 3, 4) of the supporting structure meet one another, and
    wherein at least one subcompartment is an enclosed subcompartment at least half-filled with acoustic insulation material (13).

7. A loudspeaker box in a vehicle having a supporting structure, comprising
    at least one active sound transducer (10), including a diaphragm with first and second sides, fitted in the loudspeaker box,
    at least first and second subcompartments, wherein the sound transducer positioned such that each of its two sides of the diaphragm is adjoined by a one of the respective subcompartments which are isolated from one another and which are formed by the volume of the cavity in at least one element (2, 3, 4) of the supporting structure of the vehicle (1), and at least one sound tunnel (11) between a subcompartment and the vehicle interior in which at least some of the sound waves produced in the subcompartments by the sound transducer (10) are introduced into the interior of the vehicle (1), wherein the subcompartments are formed by at least two elements (2, 3, 4) of the supporting structure of the vehicle (1), wherein the sound transducer (10) is integrated in a region in which at least two elements (2, 3, 4) of the supporting structure meet one another, and wherein the walls of the subcompartment opening to the vehicle interior by means of the tunnel (11) are at least partly provided with insulation material.

* * * * *